US008264461B2

(12) United States Patent
Brosnan et al.

(10) Patent No.: US 8,264,461 B2
(45) Date of Patent: Sep. 11, 2012

(54) APPARATUS FOR CONTROLLING THE POSITION OF A SCREEN POINTER WITH LOW SENSITIVITY TO PARTICLE CONTAMINATION

(75) Inventors: Michael J. Brosnan, Fremont, CA (US); Ramakrishna Kakarala, Santa Clara, CA (US); Roopinder Singh Grewal, San Jose, CA (US); Mark M. Butterworth, Santa Clara, CA (US); Vincent C. Moyer, Milpitas, CA (US); Tong Xie, Santa Clara, CA (US); Marshall T. Depue, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 960 days.

(21) Appl. No.: 12/060,796

(22) Filed: Apr. 1, 2008

(65) Prior Publication Data
US 2008/0246725 A1 Oct. 9, 2008

Related U.S. Application Data

(62) Division of application No. 10/805,814, filed on Mar. 22, 2004, now Pat. No. 7,446,756.

(51) Int. Cl.
*G09G 5/08* (2006.01)
*G01P 3/36* (2006.01)
(52) U.S. Cl. ......... 345/166; 345/104; 345/163; 345/207
(58) Field of Classification Search .................. 345/104, 345/163, 166, 182, 207; 250/200, 206, 208.1
See application file for complete search history.

(56) References Cited

U.S. PATENT DOCUMENTS

| 4,409,479 | A | 10/1983 | Sprague et al. |
| 4,794,384 | A | 12/1988 | Jackson |
| 4,920,260 | A | 4/1990 | Victor et al. |
| 5,248,873 | A | 9/1993 | Allen et al. |
| 5,578,813 | A | 11/1996 | Allen et al. |
| 5,578,817 | A | 11/1996 | Bidiville |
| 5,644,139 | A | 7/1997 | Allen et al. |
| 5,703,356 | A | 12/1997 | Bidiville et al. |
| 5,719,705 | A | 2/1998 | Machol |
| 5,748,872 | A | 5/1998 | Norman |
| 5,786,804 | A | 7/1998 | Gordon |

(Continued)

FOREIGN PATENT DOCUMENTS
DE 20019915 5/2001
(Continued)

OTHER PUBLICATIONS

Yoshida, A. "Optical Computing Techniques for Image/Video Compression", *Proceedings of the IEEE* vol. 82, Issue 6, Digital Object Identifier 10.1109/5.286198., (Jun. 1994),948-954.

(Continued)

*Primary Examiner* — My-Chau T Tran

(57) ABSTRACT

An apparatus for controlling the position of a screen pointer includes an at least partially coherent light source for illuminating an imaging surface, thereby generating reflected images. The apparatus includes a navigation sensor for generating digital images based on the reflected images, performing a movement computation based on the digital images, generating movement data based on the movement computation that is indicative of relative motion between the imaging surface and the apparatus, wherein the movement computation has a low sensitivity to effects in the digital images caused by particle contamination.

12 Claims, 7 Drawing Sheets

U.S. PATENT DOCUMENTS

| | | | |
|---|---|---|---|
| 5,854,482 | A | 12/1998 | Bidiville et al. |
| 5,965,879 | A | 10/1999 | Leviton |
| 6,084,574 | A | 7/2000 | Bidiville et al. |
| 6,093,923 | A | 7/2000 | Vock et al. |
| 6,124,587 | A | 9/2000 | Bidiville et al. |
| 6,218,659 | B1 | 4/2001 | Bidiville et al. |
| 6,256,016 | B1 | 7/2001 | Piot et al. |
| 6,264,756 | B1 | 7/2001 | Boys |
| 6,281,882 | B1 | 8/2001 | Gordon et al. |
| 6,320,173 | B1 | 11/2001 | Vock et al. |
| 6,509,889 | B2 | 1/2003 | Kamper et al. |
| 6,529,622 | B1 | 3/2003 | Pourjavid |
| 6,603,111 | B2 | 8/2003 | Dietz et al. |
| 6,657,184 | B2 | 12/2003 | Anderson et al. |
| 6,666,926 | B2 | 12/2003 | Naghi et al. |
| 6,720,950 | B2 | 4/2004 | Cheng |
| 6,741,234 | B2 | 5/2004 | Son |
| 6,750,846 | B2* | 6/2004 | Rotzoll .................... 345/157 |
| 6,770,863 | B2 | 8/2004 | Walley |
| 6,788,875 | B1 | 9/2004 | Bidiville |
| 6,823,077 | B2 | 11/2004 | Dietz et al. |
| 6,844,872 | B1 | 1/2005 | Farag et al. |
| 6,967,321 | B2 | 11/2005 | Leong et al. |
| 7,009,644 | B1 | 3/2006 | Sanchez |
| 7,019,733 | B2 | 3/2006 | Koay |
| 7,071,922 | B2 | 7/2006 | Sun et al. |
| 7,079,116 | B2* | 7/2006 | Park et al. .................. 345/163 |
| 7,122,781 | B2* | 10/2006 | Rotzoll et al. ............... 250/221 |
| 7,127,737 | B1 | 10/2006 | Bayrakeri et al. |
| 7,161,582 | B2 | 1/2007 | Bathiche et al. |
| 7,166,831 | B2 | 1/2007 | Depue et al. |
| 7,176,432 | B2 | 2/2007 | Komiya |
| 7,227,531 | B2 | 6/2007 | Lutian |
| 7,283,164 | B2 | 10/2007 | Kakarala et al. |
| 7,613,329 | B2* | 11/2009 | Grewal et al. ............... 382/107 |
| 2001/0005915 | A1 | 7/2001 | Naghi et al. |
| 2002/0080117 | A1 | 6/2002 | Son et al. |
| 2002/0080120 | A1 | 6/2002 | Son |
| 2002/0101587 | A1 | 8/2002 | Wilson et al. |
| 2002/0180880 | A1 | 12/2002 | Bean et al. |
| 2003/0001078 | A1 | 1/2003 | Baharav et al. |
| 2003/0103037 | A1 | 6/2003 | Rotzoll |
| 2003/0146975 | A1 | 8/2003 | Joung et al. |
| 2004/0051798 | A1 | 3/2004 | Kakarala et al. |
| 2004/0095321 | A1 | 5/2004 | Sun et al. |
| 2004/0246232 | A1 | 12/2004 | Chang et al. |
| 2005/0024336 | A1 | 2/2005 | Xie et al. |
| 2005/0083303 | A1 | 4/2005 | Schroeder et al. |
| 2005/0195163 | A1 | 9/2005 | Grewal et al. |
| 2005/0206614 | A1 | 9/2005 | Brosnan et al. |
| 2005/0283307 | A1 | 12/2005 | Siah et al. |
| 2006/0044267 | A1 | 3/2006 | Xie et al. |

FOREIGN PATENT DOCUMENTS

| | | | |
|---|---|---|---|
| DE | 10226950 | | 4/2003 |
| JP | 05115040 | | 5/1993 |
| WO | WO-00/38103 | | 6/2000 |
| WO | WO 03/049018 | * | 6/2003 |

OTHER PUBLICATIONS

Berra, P. B. "Optics and Supercomputing", *Proceedings of the IEEE* vol. 77, Issue 12, Digital Object Identifier 10.1109/5.48824, (Dec. 1989),1797-1815.

Nirmaier, T et al., "High Speed CMOS Wavefront Sensor with Resistive Ring Networks of Winner Take All Circuits", *Solid state Circuits, IEEE Journal of* vol. 40, Issue 11, Digital Object Identifier 10.1109/JSSC.2005.857350., (Nov. 2005),2315-2322.

Chu, P.L. et al., "Optimal Projection for Multidimensional Signal Detection", *Acoustics, Speech, and Signal Processing* (see also *IEEE Transaction on Signal Processing*), IEEE Transactions on, vol. 36, Issue 5, Digital Object Identifier 10.1109/29.1587., (May 1988),775-786.

Downs, J et al., "An Improved Video-Based Computer Tracking System for Soft Biomaterials Testing", *Biomedical Ingineering, IEEE Transaction on*, vol. 37, Issue 9, Digital Object Identifier 10.1109/10.58600, (1990),903-907.

Williamson, I.C. et al., "Source Width Insensitive Optical Position Sensor", *Instumentation and Measurement, IEEE Transactions on* vol. 43, Issue 6, (Dec. 1994),848-856.

Tartagni, M et al., "A Photodiode Cell for Applications to Position and Motion Estimation Sensors", *Industrial Electronics, IEEE Transactions on*, vol. 43, Issue 1, Digital Object Identifier 10.1109/41.481426., (Feb. 1996),200-206.

Miller, M.I. et al., "Automatic Target Recongnition Organized Via Jump-Diffusions Algorithms", *Image Processing, IEEE Transactions on*, vol. 6, Issue 1, Digital Object Identifier 10.1109/83.552104, vol. 6, Issue 1,(1997),157-174.

Scheffer, D. et al., "Random Addressable 2048×2048 Active Pixel Image Sensor", *Electron Devices, IEEE Transactions on*, vol. 44, Issue 10, Digital Object Identifier 10.1109/16.628827., (1997),1716-1720.

Clapp, M.A. et al., "A Dual Pixel Type Array for Imaging and Motion Centroid Localization", *Sensor Journal, IEEE*, vol. 2, Issue 6, Digital Object Identifier 10.1109/JSEN.2002.806894., (Dec. 2002),529-548.

Weisenberger, A.G. et al., "A Restraint Free Small Animal SPECT Imaging System with Motion Tracking", *Nuclear Science, IEEE Transactions on* vol. 52, Issue 3, Part 1, vol. 52, Issue 3 Part 1,(Jun. 2005),638-644.

Burns, R.D. "Object Location and Centroiding Techniques with CMOS Active Pixel Sensors", *Electron Devices, IEEE Transactions on*, vol. 50 Issue 12, Digital Object Identifier 10.1109/TED.2003.819260., (Dec. 2003),2369-2377.

Higgins, C.M. et al., "A Biologically Inspired Modular VLSI System for Visual Measurement of Self-Motion", *Sensor Journal, IEEE*, vol. 2 Issue 6, Digital Object Identifier 10.1109/JSEN.2002./807304., (Dec. 2002),508-528.

Honghao, Ji et al., "CMOS Contact Imager for Monitoring Cultured Cell", *Circuits and Systems, 2005. ISCAS 2005. IEEE International Symposium*, vol. 4, Digital Object Identifier 10.1109/ISCAS.2005.1465381., (May 23-26, 2005),3491-3494.

Svelto, Orazio "Principles of Lasers", (1998, 1989, 1982, 1976),9-10.

Lucas, Bruce D., et al., "An Iterative Registration Technique with an Application to Stereo Vision", (Aug. 24-28, 1981),674-679.

Jin, B. et al., "Modeling and Analysis of Soft-Test/Repair for CCD-Based Digital X-Ray System", *IEEE Transactions and Measurements* Dec. 2003, 1713-1721, vol. 52, No. 6.

Chen, Yang "Highway Overhead Structure Detection Using Video Image Sequences", *Intelligent Transportation Systems, IEEE Transactions on* vol. 4, Issue 2, Digital Object Identifier 10.1109/TITS.2003.821209. Jun. 2003, 67-77.

* cited by examiner

APPARATUS FOR CONTROLLING THE POSITION OF A SCREEN POINTER WITH LOW SENSITIVITY TO PARTICLE CONTAMINATION

CROSS-REFERENCE TO RELATED APPLICATIONS

This is a Divisional of U.S. patent application Ser. No. 10/805,814, filed on Mar. 22, 2004, now issued as U.S. Pat. No. 7,446,756, the entire disclosure of which is incorporated herein by reference. This application is related to U.S. patent application Ser. No. 10/795,688, filed Mar. 8, 2004, and entitled APPARATUS FOR CONTROLLING THE POSITION OF A SCREEN POINTER THAT DETECTS DEFECTIVE PIXELS, now issued as U.S. Pat. No. 7,613,329; and U.S. patent application Ser. No. 10/806,367, filed on Sep. 17, 2004, and entitled CONTAMINANT-RESISTANT OPTICAL MOUSE AND CRADLE, now issued as U.S. Pat. No. 7,474,297.

THE FIELD OF THE INVENTION

This invention relates generally to devices for controlling a pointer on a display screen, and relates more particularly to an apparatus for controlling the position of a screen pointer with low sensitivity to particle contamination.

BACKGROUND OF THE INVENTION

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and an image sensor within the optical pointing device, is optically sensed and converted into movement information.

Electronic image sensors, such as those typically used in optical pointing devices, are predominantly of two types: CCDs (Charge Coupled Devices) and CMOS-APS (Complimentary Metal Oxide Semiconductor-Active Pixel Sensors). Both types of sensors typically contain an array of photodetectors (e.g., pixels), arranged in a pattern. Each individual photodetector operates to output a signal with a magnitude that is proportional to the intensity of light incident on the site of the photodetector. These output signals can then be subsequently processed and manipulated to generate an image that includes a plurality of individual picture elements (pixels), wherein each pixel in the image corresponds with one of the photodetectors in the image sensor.

Despite advances in the manufacturing process, digital image sensors often contain a few defective pixels as a result of noise or fabrication errors, such as impurity contamination. Defective pixels can also arise after the manufacturing process and during use by a customer. Defective pixels respond inappropriately to the incident light, and therefore produce inaccurate sensor values. Defective pixels are predominantly of three types: stuck high, stuck low, or abnormal sensitivity. A stuck high pixel has a very high or near to full scale output, while a stuck low pixel has a very low or near to zero output. An abnormal sensitivity pixel produces a sensor value different from neighboring pixels by more than a certain amount when exposed to the same light conditions.

If the image sensor of an optical pointing device contains defective pixels, such as stuck high or stuck low pixels, the values from these pixels may never change, which biases the navigation computation and can cause errors. The values from abnormal sensitivity pixels may change, but such pixels do not perform as expected and can also cause errors. The bad pixels can be caused by one or more of the following: (1) defects in the silicon; (2) external contamination (e.g., particles such as dust or dirt, fibers, "flash," etc., landing on the array); and (3) improper illumination (e.g., the illumination spot can be de-centered such that part of the array is too "dark"). "Flash" is mold compound that sticks out from a molded piece and that can come loose from the molded piece during production or during use by a customer, and cause particle contamination of the array.

For optical pointing devices that use incoherent illumination, such as typical LED-based devices, dust and other particle contamination may remain out of focus and, therefore, have a negligible effect on performance. In contrast, optical pointing devices that use coherent illumination, such as light from a laser, are more sensitive to dust particles adhering to the illumination source or the focusing optics. Coherent illumination of dust particles and other particle contamination can produce visible fringe artifacts in the generated images, which adversely affects performance. It is difficult to completely eliminate particle contamination in optical pointing devices.

SUMMARY OF THE INVENTION

One form of the present invention provides an apparatus for controlling the position of a screen pointer. The apparatus includes an at least partially coherent light source for illuminating an imaging surface, thereby generating reflected images. The apparatus includes a navigation sensor for generating digital images based on the reflected images, performing a movement computation based on the digital images, generating movement data based on the movement computation that is indicative of relative motion between the imaging surface and the apparatus, wherein the movement computation has a low sensitivity to effects in the digital images caused by particle contamination.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

As mentioned above in the Background of the Invention section, particle contamination can adversely affect the performance of optical pointing devices that use coherent illumination. It is difficult to completely eliminate particle contamination in these optical pointing devices. Thus, one form of the present invention provides a compensation mechanism to cope with dust or other particle contamination being present. In one embodiment, compensation is included in the digital processing of images, which is performed by a navigation processor after images are acquired. In one form of the invention, the digital processing or computations performed by the navigation processor have a low sensitivity (i.e., high tolerance) to effects in the acquired digital images caused by particle contamination. An important aspect of the dust tolerant digital processing that is performed according to one embodiment of the invention is that dust, or other particle contamination, once it adheres to an imaging surface and is coherently illuminated, forms a fixed pattern in the captured images. Thus, one form of the invention provides a method for removing or suppressing fixed patterns in the digital images captured by an optical pointing device.

I. Optical Pointing Device

Figure 1:
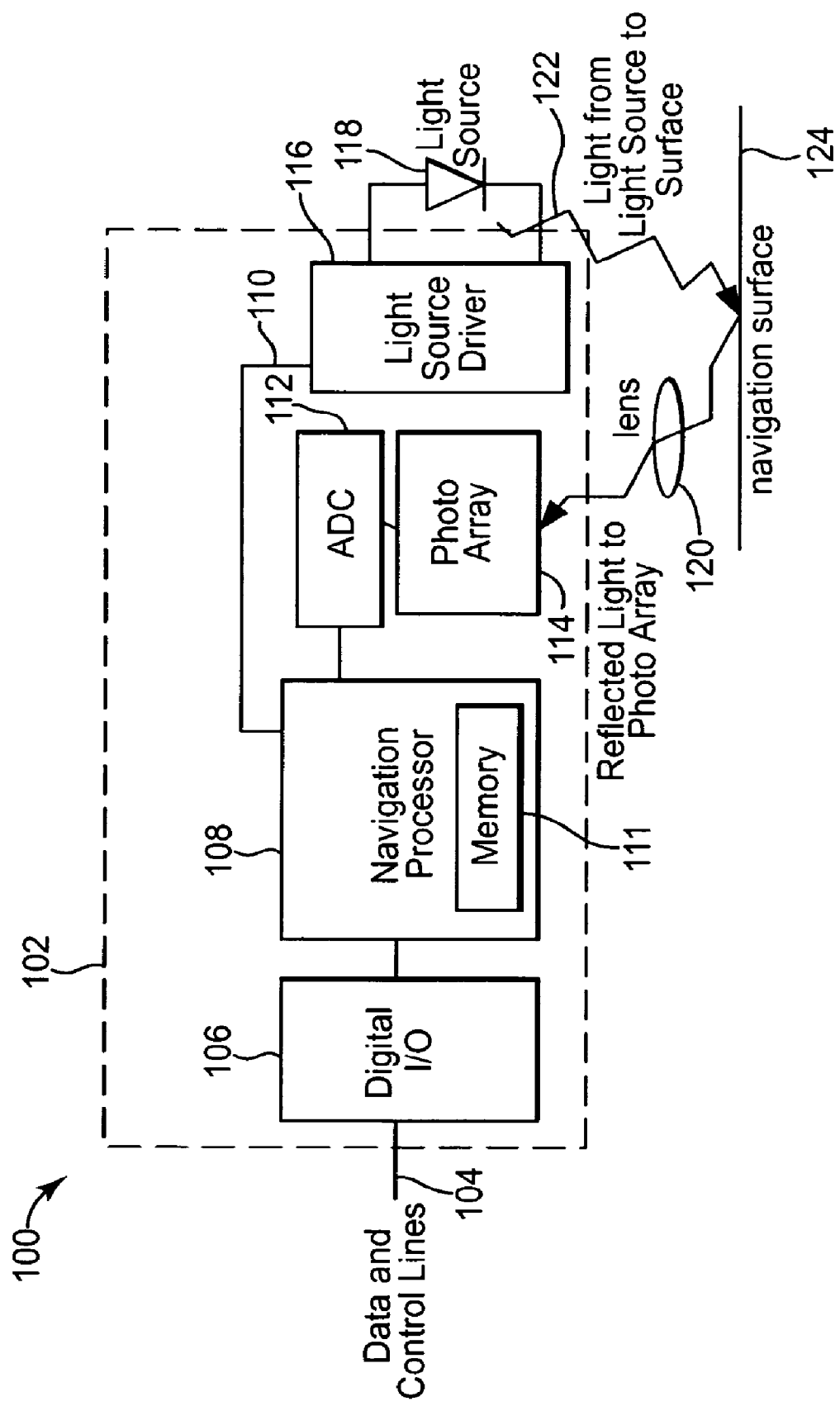
FIG. 1 is a block diagram illustrating major components of an optical pointing device according to one embodiment of the present invention.

FIG. 1 is a block diagram illustrating major components of an optical pointing device 100 according to one embodiment of the present invention. Optical pointing device 100 includes optical navigation sensor integrated circuit (IC) 102, light source 118, and lens 120. Optical navigation sensor 102 includes digital input/output circuitry 106, navigation processor 108, analog to digital converter (ADC) 112, photodetector array (photo array) 114, and light source driver circuit 116. In one embodiment, optical pointing device 100 is an optical mouse for a desktop personal computer, workstation, portable computer, or other device. In another embodiment, optical pointing device 100 is configured as an optical fingerprint sensing pointing device, or other pointing device.

In operation, according to one embodiment, light source 118 emits light 122 onto navigation surface 124, which is a desktop or other suitable imaging surface, and reflected images are generated. In one embodiment, light source 118 is a coherent light source or an at least partially coherent light source. In one embodiment, light source 118 is a laser. In one form of the invention, light source 118 is a vertical cavity surface emitting laser (VCSEL) diode. In another form of the invention, light source 118 is an edge emitting laser diode. Light source 118 is controlled by driver circuit 116, which is controlled by navigation processor 108 via control line 110. In one embodiment, control line 110 is used by navigation processor 108 to cause driver circuit 116 to be powered on and off, and correspondingly cause light source 118 to be powered on and off.

Reflected light from surface 124 is directed by lens 120 onto photodetector array 114. Each photodetector in photodetector array 114 provides a signal that varies in magnitude based upon the intensity of light incident on the photodetector. The signals from photodetector array 114 are output to analog to digital converter 112, which converts the signals into digital values of a suitable resolution (e.g., eight bits). The digital values represent a digital image or digital representation of the portion of the desktop or other navigation surface under optical pointing device 100. The digital values generated by analog to digital converter 112 are output to navigation processor 108. The digital values received by navigation processor 108 are stored as frames within memory 111.

The overall size of photodetector array 114 is preferably large enough to receive an image having several features. Images of such spatial features produce translated patterns of pixel information as optical pointing device 100 moves over navigation surface 124. The number of photodetectors in array 114 and the frame rate at which their contents are captured and digitized cooperate to influence how fast optical pointing device 100 can be moved across a surface and still be tracked. Tracking is accomplished by navigation processor 108 by comparing a newly captured sample frame with a previously captured reference frame to ascertain the direction and amount of movement.

In one embodiment, navigation processor 108 performs a cross-correlation of sequential frames to determine motion information. In one form of the invention, the entire content of one of the frames is shifted by navigation processor 108 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by navigation processor 108 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information ($\Delta X$ and $\Delta Y$) of a convenient granularity and at a suitable rate of information exchange, which is output to a host device by digital input/output circuitry 106 on data and control lines 104. Optical pointing device 100 is also configured to receive data and control signals from a host device via data and control lines 104.

II. Defect Tolerant Displacement Calculations

In one form of the invention, rather than performing a correlation of successive digital images to determine movement information as described above, navigation processor 108 is configured to perform movement computations or displacement calculations that have a low sensitivity to effects in the acquired digital images caused by particle contamination, such as dust. Particle contamination causes pixels in the digital images captured by device 100 to have inappropriate pixel values. The pixels affected by the particle contamination are referred to herein as defective pixels. In addition to particle contamination, defective pixels can also be caused by other problems, such as silicon defects. A defective pixel is defined to include an aberrant or inoperative pixel, such as a pixel that exhibits only an "ON" or an "OFF" state, a pixel that produces less intensity or more intensity than desired, or a pixel with inconsistent or random operation. Regardless of the source of the defects, the defective pixels form a fixed pattern in the captured digital images. One form of the present invention provides a method for generating movement data that has a low sensitivity to defective pixels in general, regardless of the cause of the defects. Defect tolerant displacement calculations that are performed by navigation processor 108 according to various embodiments of the present invention are described below with reference to FIGS. 2-4.

Figure 2:
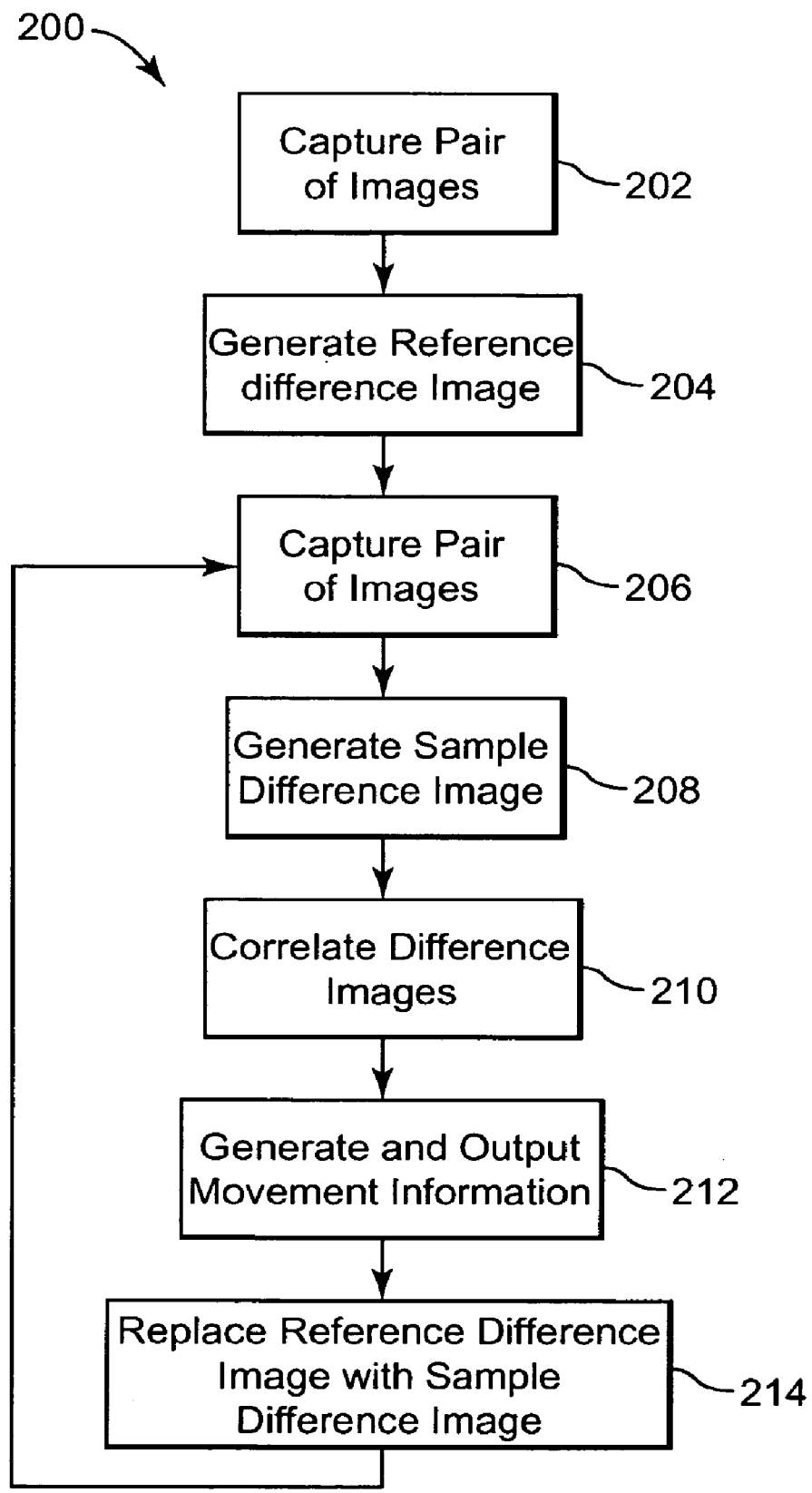
FIG. 2 is a flow diagram illustrating a method for generating movement data with the optical pointing device shown in FIG. 1 using temporal differences according to one embodiment of the present invention.

FIG. 2 is a flow diagram illustrating a method 200 for generating movement data with optical pointing device 100 using temporal differences according to one embodiment of the present invention. In step 202, a pair of temporally offset images is acquired by photo array 114. The acquired images are converted into digital images by analog to digital converter 112, and the digital images are output to navigation processor 108. In step 204, navigation processor 108 subtracts the two digital images (acquired in step 202) on a pixel-by-pixel basis, thereby generating a difference image, which is referred to as a reference difference image. In step 206, another pair of temporally offset images is acquired by photo array 114. The acquired images are converted into digital images by analog to digital converter 112, and the digital images are output to navigation processor 108. In step 208, navigation processor 108 subtracts the two digital images (acquired in step 206) on a pixel-by-pixel basis, thereby generating another difference image, which is referred to as a sample difference image.

In step 210, navigation processor 108 correlates the reference difference image (generated in step 204) with the sample difference image (generated in step 208), and determines a magnitude and direction of movement based on the correlation. In step 212, navigation processor 108 generates movement information based on the correlation performed in step 210, and outputs the movement information to a host device via digital input/output circuitry 106. In step 214, the reference difference image (generated in step 204) is replaced by the sample difference image (generated in step 208), which then becomes the reference difference image for the next iteration of method 200. Another pair of temporally offset images is then acquired in step 206, and the method 200 is repeated from step 206. Any desired number of iterations of method 200 may be performed.

The temporal differencing in method 200 reduces the fixed pattern sensitivity of the computations made by navigation processor 108. In one embodiment, four consecutive images are acquired at equal time intervals between each image. Differences between a first set of two of the images and a second set of two of the images are correlated to determine movement information. In another embodiment, the time interval between captured images is varied, to provide, for example, in a set of four consecutive images, a different time interval between the first and second images than the time interval between the third and the fourth images.

Figure 3:
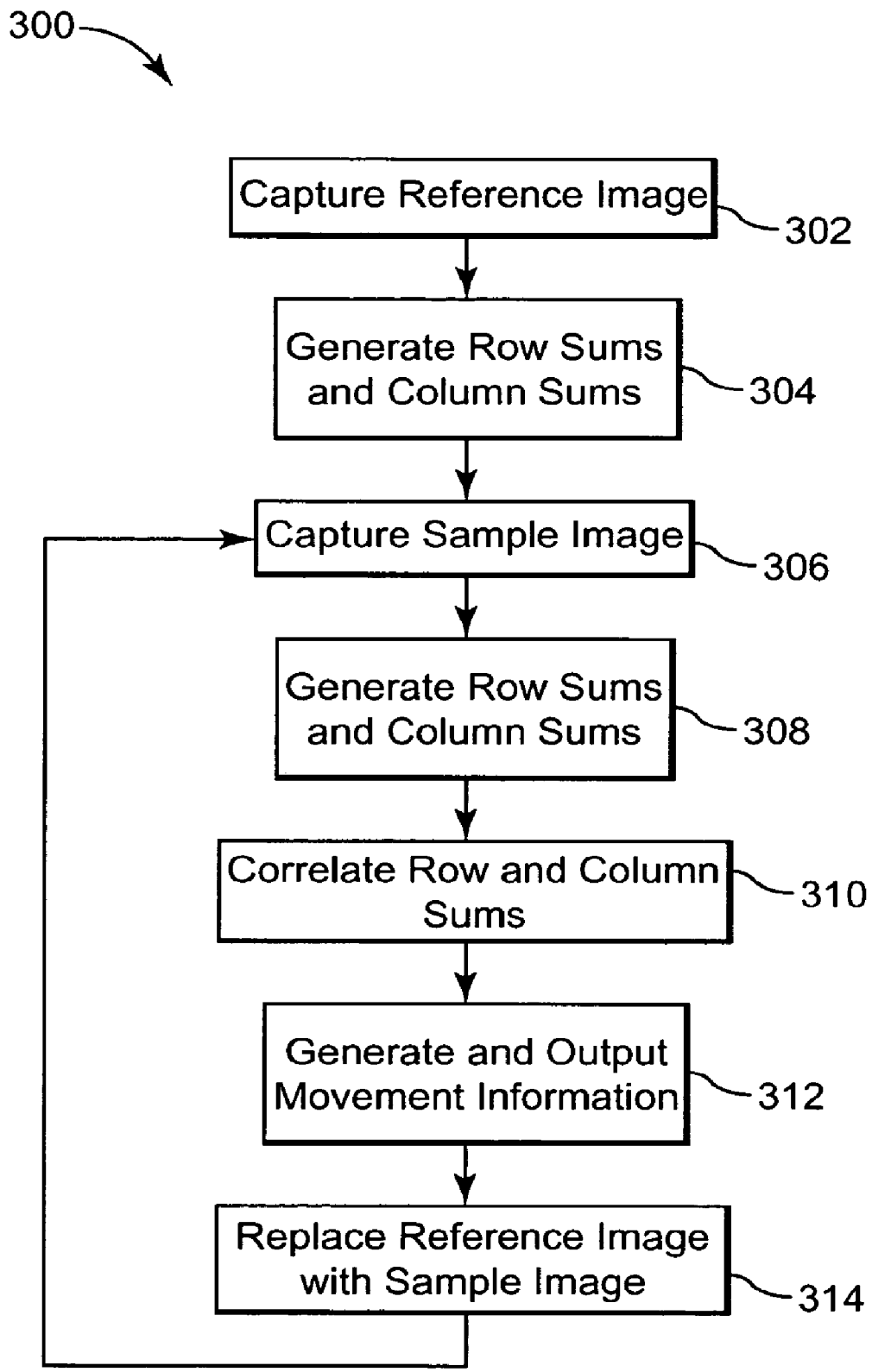
FIG. 3 is a flow diagram illustrating a method for generating movement data with the optical pointing device shown in FIG. 1 using cross-correlation of row sums and column sums according to one embodiment of the present invention.

FIG. 3 is a flow diagram illustrating a method 300 for generating movement data with optical pointing device 100 using cross-correlation of row sums and column sums according to one embodiment of the present invention. In step 302, a reference image is acquired by photo array 114. The acquired image is converted into a digital image by analog to digital converter 112, and the reference digital image is output to navigation processor 108. In step 304, navigation processor 108 sums the pixel values in each row of the reference digital image, thereby generating a plurality of row sums, and also sums the pixel values in each column of the reference digital image, thereby generating a plurality of column sums.

In step 306, a sample image is acquired by photo array 114. The acquired image is converted into a digital image by analog to digital converter 112, and the sample digital image is output to navigation processor 108. In step 308, navigation processor 108 sums the pixel values in each row of the sample digital image, thereby generating a plurality of row sums, and also sums the pixel values in each column of the sample digital image, thereby generating a plurality of column sums.

In step 310, navigation processor 108 correlates the plurality of row sums of the reference digital image (acquired in step 302) with the plurality of rows sums of the sample digital image (acquired in step 306); correlates the plurality of column sums of the reference digital image with the plurality of column sums of the sample digital image; and determines a magnitude and direction of movement based on the correlations. In step 312, navigation processor 108 generates movement information based on the correlations performed in step 310, and outputs the movement information to a host device via digital input/output circuitry 106. In step 314, the reference digital image (acquired in step 302) is replaced by the sample digital image (acquired in step 306), which then becomes the reference digital image for the next iteration of method 300. Another sample image is then acquired in step 306, and the method 300 is repeated from step 306. Any desired number of iterations of method 300 may be performed.

By performing cross-correlations on row and column sums of pixel values, which are also referred to as "projections", rather than on individual pixel values, the sensitivity of the computations made by navigation processor 108 to fixed pattern artifacts is reduced. The fixed pattern sensitivity is reduced because the projections inherently average the pixel values.

Figure 4:
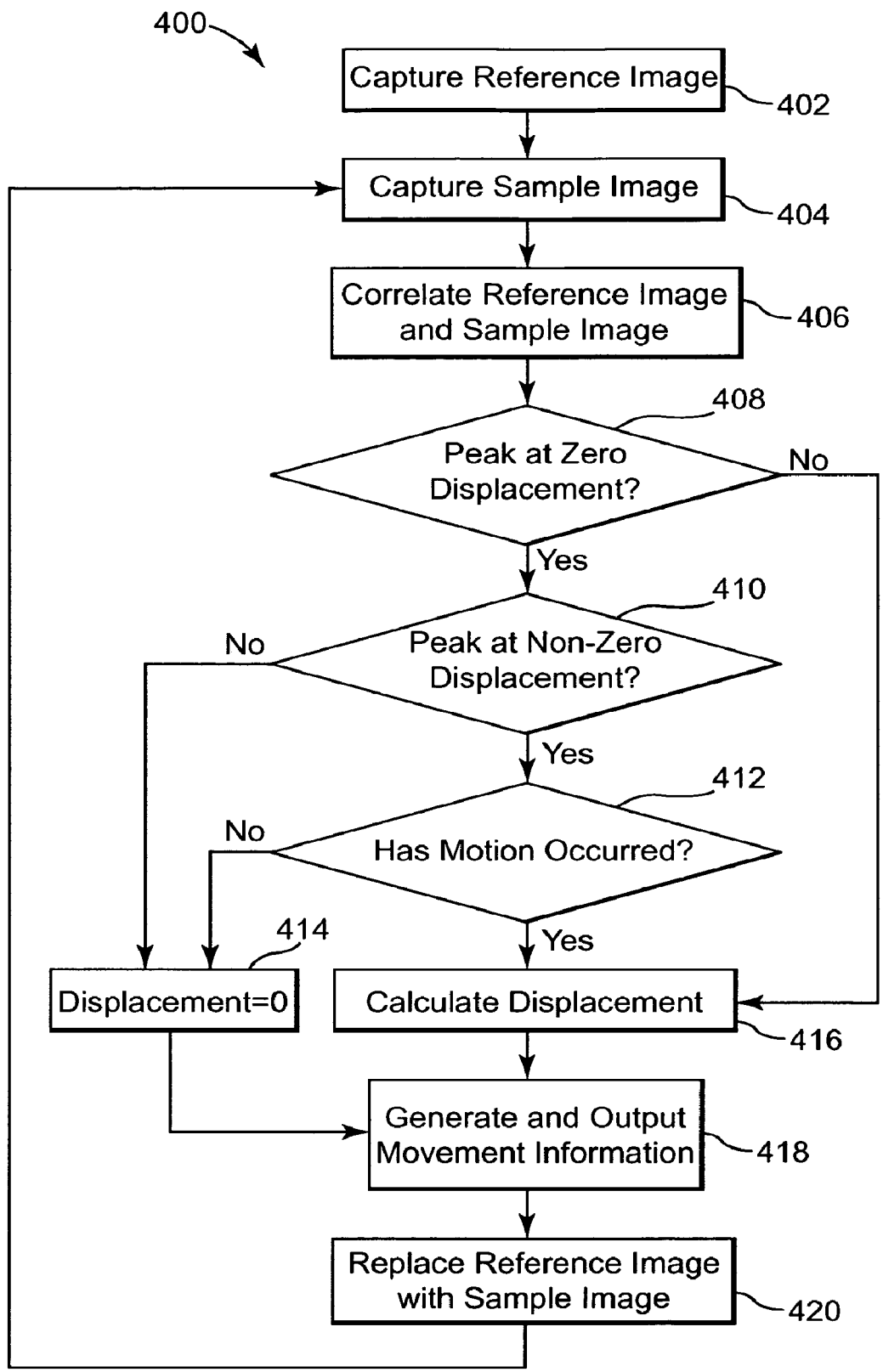
FIG. 4 is a flow diagram illustrating a method for generating movement data with the optical pointing device shown in FIG. 1 using false correlation peak detection according to one embodiment of the present invention.

FIG. 4 is a flow diagram illustrating a method 400 for generating movement data with optical pointing device 100 using false correlation peak detection according to one embodiment of the present invention. In step 402, a reference image is acquired by photo array 114. The acquired image is converted into a digital image by analog to digital converter 112, and the reference digital image is output to navigation processor 108. In step 404, a sample image is acquired by photo array 114. The acquired image is converted into a digital image by analog to digital converter 112, and the sample digital image is output to navigation processor 108.

In step 406, navigation processor 108 performs a cross-correlation of the pixel values of the reference digital image with the pixel values of the sample digital image, thereby generating at least one correlation peak. Fixed patterns in the images that are correlated result in false correlation peaks occurring at a location corresponding to a zero (0,0) displacement. These peaks are referred to as "false" correlation peaks because they indicate that no movement has occurred, when, in fact, movement may have occurred between the two images. In one embodiment, as described in further detail below, these false correlation peaks are ignored if there is evidence that motion is occurring.

In step 408, navigation processor 108 determines whether the correlation performed in step 406 has produced a correlation peak at a location corresponding to zero displacement. If the correlation has not produced a correlation peak at a location corresponding to zero displacement, the method 400 moves to step 416 (described below). If the correlation has produced a correlation peak at a location corresponding to zero displacement, the method 400 moves to step 410.

In step 410, navigation processor 108 determines whether the correlation performed in step 406 has produced a correlation peak at a location corresponding to a non-zero displacement. If the correlation has not produced a correlation peak at a location corresponding to a non-zero displacement, the method 400 moves to step 414 (described below). If the correlation has produced a correlation peak at a location corresponding to a non-zero displacement, the method 400 moves to step 412.

In step 412, navigation processor 108 determines whether motion has occurred between capturing of the reference image (step 402) and capturing of the sample image (step 404). In one embodiment, navigation processor 108 determines whether motion has occurred in step 412 by monitoring a single pixel, or a plurality of pixels, in the reference image and the sample image, and determining whether the single pixel (or plurality of pixels) has changed in value by a threshold amount, which would indicate that motion has occurred. In one form of the invention, navigation processor 108 determines whether motion has occurred in step 412 by determining whether a strong secondary peak (e.g., a peak with a magnitude greater than a given threshold) occurs at a location corresponding to a non-zero displacement, either for one correlation calculation, or for multiple correlation calculations. If navigation processor 108 determines in step 412 that motion has not occurred, the method 400 moves to step 414. If navigation processor 108 determines in step 412 that motion has occurred, the method 400 moves to step 416.

In step 414, navigation processor 108 determines that the correlation peak occurring at a location corresponding to zero displacement is not a false correlation peak, and that the displacement between the reference image and the sample image is zero. After step 414, the method 400 moves to step 418 (described below).

In step 416, navigation processor 108 determines that any correlation peak occurring at a location corresponding to zero displacement is a false correlation peak, and navigation processor 108 determines the displacement based on a correlation peak occurring at a location corresponding to a non-zero displacement. After step 416, the method 400 moves to step 418 (described below).

In step 418, navigation processor 108 generates movement information based on the displacement determined in step 414, or based on the displacement determined in step 416, and outputs the movement information to a host device via digital input/output circuitry 106.

In step 420, the reference digital image (acquired in step 402) is replaced by the sample digital image (acquired in step 404), which then becomes the reference digital image for the next iteration of method 400. Another sample image is then acquired in step 404, and the method 400 is repeated from step 404. Any desired number of iterations of method 400 may be performed.

III. Defective Pixel Detector

Figure 5:
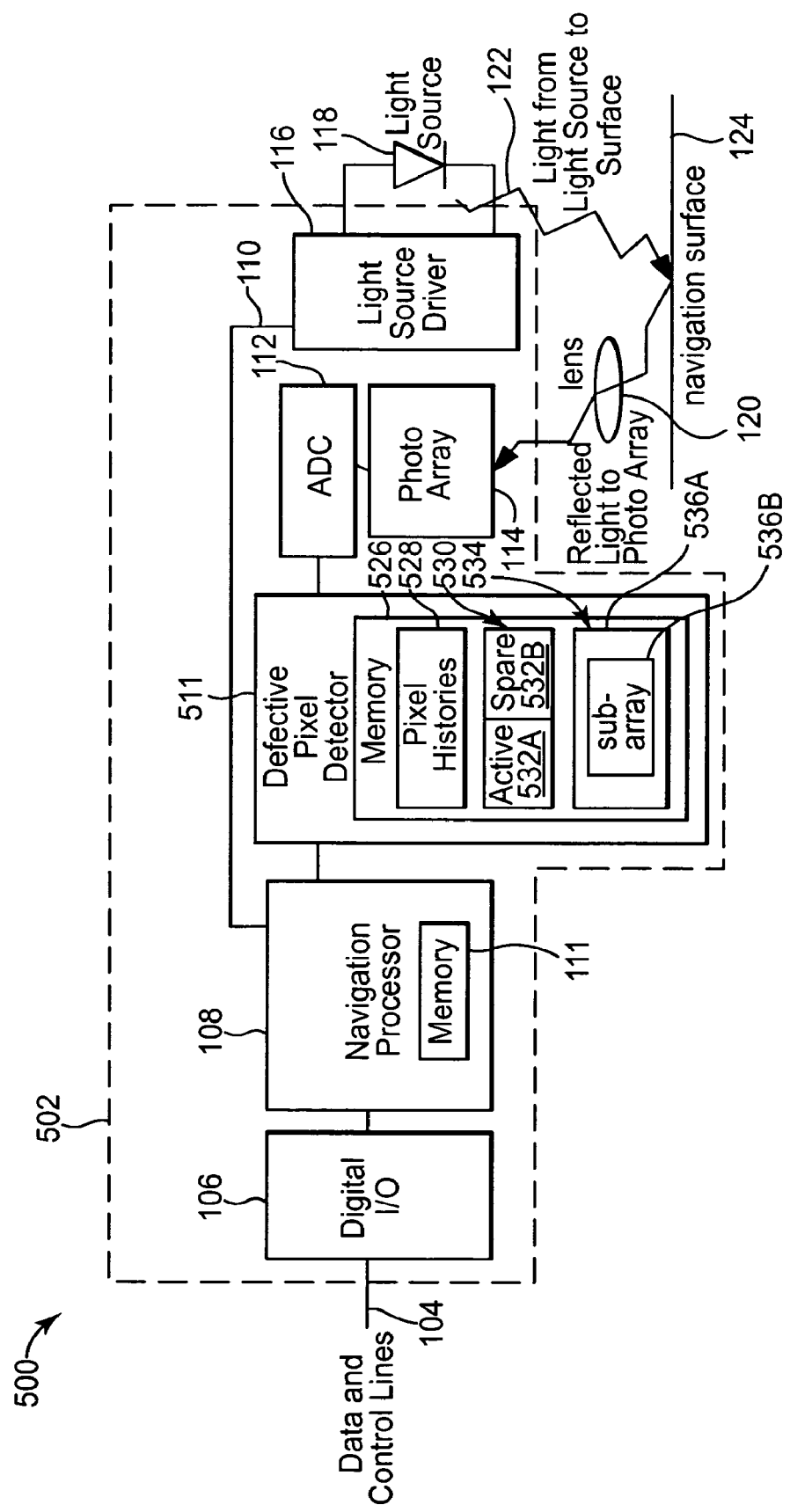
FIG. 5 is a block diagram illustrating major components of an optical pointing device with a defective pixel detector according to one embodiment of the present invention.

FIG. 5 is a block diagram illustrating major components of an optical pointing device 500 with a defective pixel detector 511 according to one embodiment of the present invention. In the embodiment illustrated in FIG. 5, optical pointing device 500 includes the same elements and is configured in the same manner as the optical pointing device 100 shown in FIG. 1, with the exception that a defective pixel detector 511 is included in optical navigation sensor integrated circuit 502.

Like optical pointing device 100, analog to digital converter 112 in optical pointing device 500 generates digital images based on the analog signals provided by photo array 114. The digital images are output to defective pixel detector 511. In one embodiment, defective pixel detector 511 identifies bad or defective pixels in the received digital images, such as pixels that are not responding properly due to dust or other particle contamination, and outputs digital image data with only "good" (i.e., non-defective) pixels to navigation processor 108. The good digital values output by defective pixel detector 511 are stored as frames within memory 111 of navigation processor 108.

There are several techniques that may be used by defective pixel detector 511 to identify defective pixels, including techniques described in co-pending application U.S. patent application Ser. No. 10/795,688, filed Mar. 8, 2004, and entitled APPARATUS FOR CONTROLLING THE POSITION OF A SCREEN POINTER THAT DETECTS DEFECTIVE PIXELS, and described below, as well as other techniques. In one embodiment, defective pixel detector 511 includes a memory 526 for storing an adaptive pixel history 528 for each of the pixels in photo array 114. In one form of the invention, the adaptive history 528 includes, for each pixel, the time since the last change in value of the pixel. In one embodiment, pixels that have not changed in value for a threshold period of time (defective pixel threshold) are identified by detector 511 as being defective, and are not used in the navigation computation by navigation processor 508, effectively removing the defective pixels from the correlation.

In one embodiment, an appropriate value for the defective pixel threshold is determined by monitoring individual pixel value changes versus changes in the average value for the whole photo array 114, or changes in an average value for a pixel's local neighbors. In this embodiment, the defective pixel threshold is adaptive, and depends on the behavior of the aggregate array 114 or a subset of the array 114.

Noise is typically an issue with digital image sensors. One form of the defective pixel detector 511 uses a method of identifying defective pixels that is robust to noise. A noise-tolerant method according to one embodiment of the invention maintains an adaptive history for each pixel by recursively updating a "smooth" frame, S, based on each captured digital image (referred to as an input frame, I). A smooth frame according to one form of the invention is a frame that changes relatively slowly compared to the changes that occur in successive input frames. The smooth frame according to one embodiment represents an average of past frames. In another embodiment of the invention, rather than using a smooth frame, a number of past frames are stored, and an average value is calculated from the stored frames. In one embodiment, defective pixel detector 511 updates the smooth frame based on each captured digital image (input frame) using the following Equation I:

$$S = a*S + (1-a)*I. \qquad \text{Equation I}$$

Where:
S=smooth frame;
a=constant value; and
I=input frame.

In one embodiment, the pixel values of the smooth frame are stored in memory 526 within defective pixel detector 511.

For values of the constant, a, near 1.0, the smooth frame changes slowly with each input frame, I, and therefore does not respond to small noise fluctuations. In one form of the invention, a value of 0.75 is used for the constant, a, in Equation I. In other embodiments, other values for the constant, a, are used.

In one embodiment, the pixel history 528 includes a set of counters that keep track of how many consecutive frames that each pixel in an input frame, I, falls within a threshold value, T, of a corresponding pixel in the smooth frame, S. In one embodiment, if the intensity of any pixel in an input frame, I, is less than the threshold, T, in absolute value from a corresponding pixel in the smooth frame, S, for N consecutive frames, then defective pixel detector 511 identifies the pixel as being defective. In one form of the invention, if a pixel's change in value from the smooth frame, S, exceeds the threshold, T, in any frame of the N consecutive frames, the pixel is deemed by defective pixel detector 511 to be active (or "good"). In one embodiment, the variable N represents an integer that is greater than one. In one embodiment, a value of "10" is used for the variable N. In other embodiments, other values are used for the variable N.

In one form of the invention, the digital images generated by analog to digital converter 112, such as digital image 530 in memory 526, include a set of active pixels 532A that are used for the navigation computation, and a set of spare pixels 532B that are not used for the navigation computation. In one embodiment, if defective pixel detector 511 detects that one of the active pixels 532A in a digital image is defective, defective pixel detector 511 deactivates the defective pixel, and activates one of the spare pixels 532B. Defective pixel detector 511 then provides the set of active pixels 532A, including the newly activated spare pixel, but not including the deactivated defective pixel, to navigation processor 108 for correlation. One embodiment of a method for generating movement data based on a set of active pixels 532A is described below with reference to FIG. 6.

Figure 6:
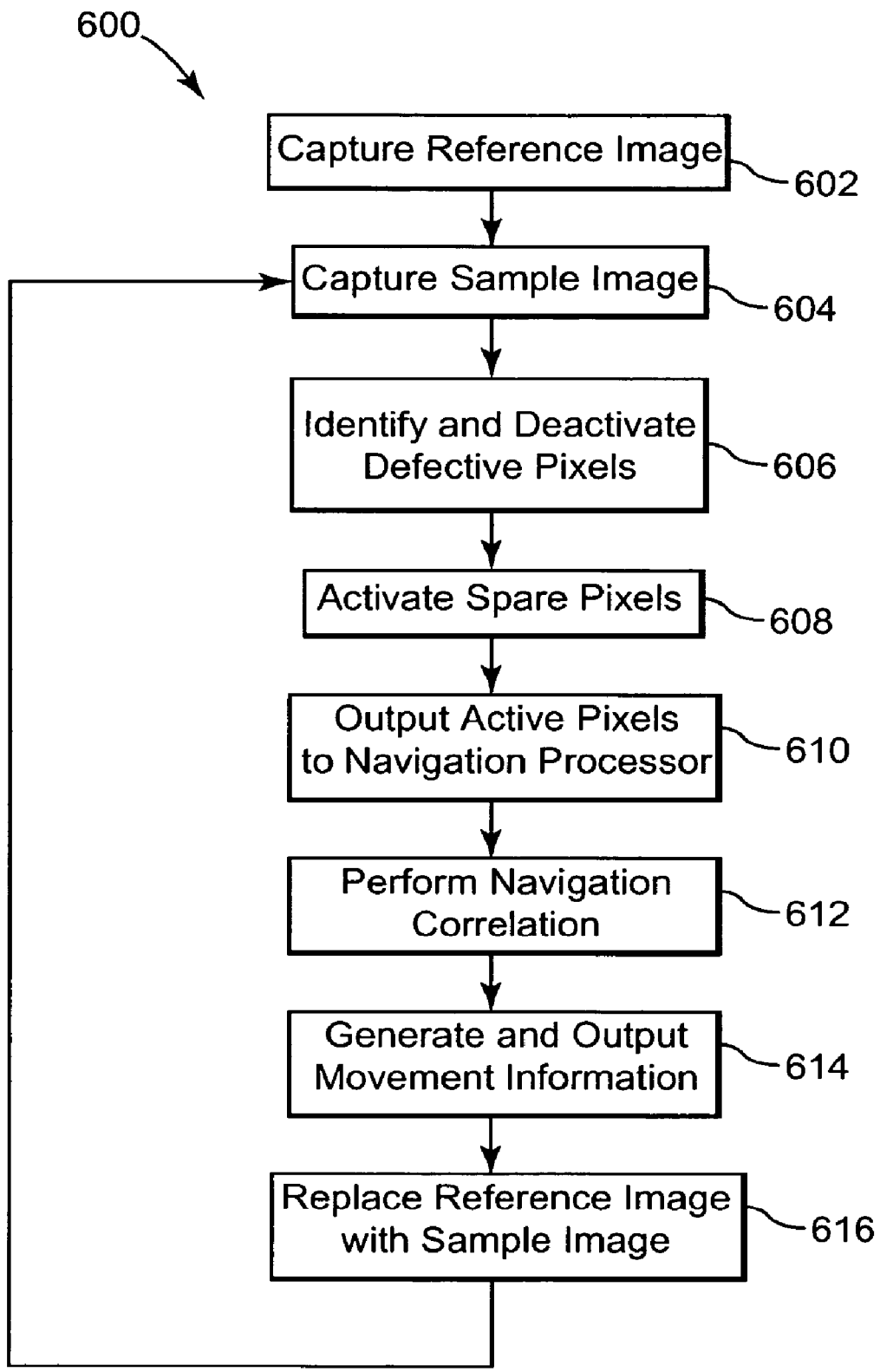
FIG. 6 is a flow diagram illustrating a method for generating movement data with the optical pointing device shown in FIG. 5 based on a set of active pixels according to one embodiment of the present invention.

FIG. 6 is a flow diagram illustrating a method 600 for generating movement data with the optical pointing device 500 shown in FIG. 5 based on a set of active pixels 532A according to one embodiment of the present invention. In step 602, a reference image is acquired by photo array 114. The acquired image is converted into a digital image by analog to digital converter 112, and the reference digital image is output to defective pixel detector 511. In step 604, a sample image is acquired by photo array 114. The acquired image is converted into a digital image by analog to digital converter 112, and the sample digital image is output to defective pixel detector 511. The reference digital image and the sample digital image each include a set of active pixels 532A and a set of spare pixels 532B.

In step 606, defective pixel detector 511 identifies and deactivates defective pixels in the reference digital image (acquired in step 602) and the sample digital image (acquired in step 604). In step 608, defective pixel detector 511 activates spare pixels 532B in the reference digital image and the sample digital image based on the defective pixels identified in step 606. In one embodiment, defective pixel detector 511 activates one spare pixel 532B for each defective pixel that is deactivated. In step 610, defective pixel detector 511 outputs the set of active pixels 532A for the reference digital image and the sample digital image to navigation processor 108. In one embodiment, the set of active pixels provided to navigation processor 108 includes any newly activated spare pixels 532B (i.e., any pixels activated in step 608), but does not include any deactivated defective pixels (i.e., any pixels deactivated in step 606). Thus, in one form of the invention, only non-defective pixels are provided to navigation processor 108 for correlation.

In step 612, navigation processor 108 correlates the received set of active pixels 532A for the reference digital image (acquired in step 602) with the set of active pixels 532A for the sample digital image (acquired in step 604), and determines a magnitude and direction of movement based on the correlation. In step 614, navigation processor 108 generates movement information based on the correlation performed in step 612, and outputs the movement information to a host device via digital input/output circuitry 106. In step 616, the reference digital image (acquired in step 602) is replaced by the sample digital image (acquired in step 604), which then becomes the reference digital image for the next iteration of method 600. Another sample image is then acquired in step 604, and the method 600 is repeated from step 604. Any desired number of iterations of method 600 may be performed.

In one embodiment, the digital images generated by analog to digital converter 112, such as digital image 534 in memory 526, include an array of pixels 536A. In one form of the invention, rather than activating spare pixels 532B as defective pixels are identified as described above, defective pixel detector 511 identifies a sub-array of non-defective pixels 536B, which are used in the navigation computation. In one embodiment, the pixels 536A outside of the sub-array 536B are not used in the navigation computation. One embodiment of a method for generating movement data based on a sub-array of pixels 536B is described below with reference to FIG. 7.

Figure 7:
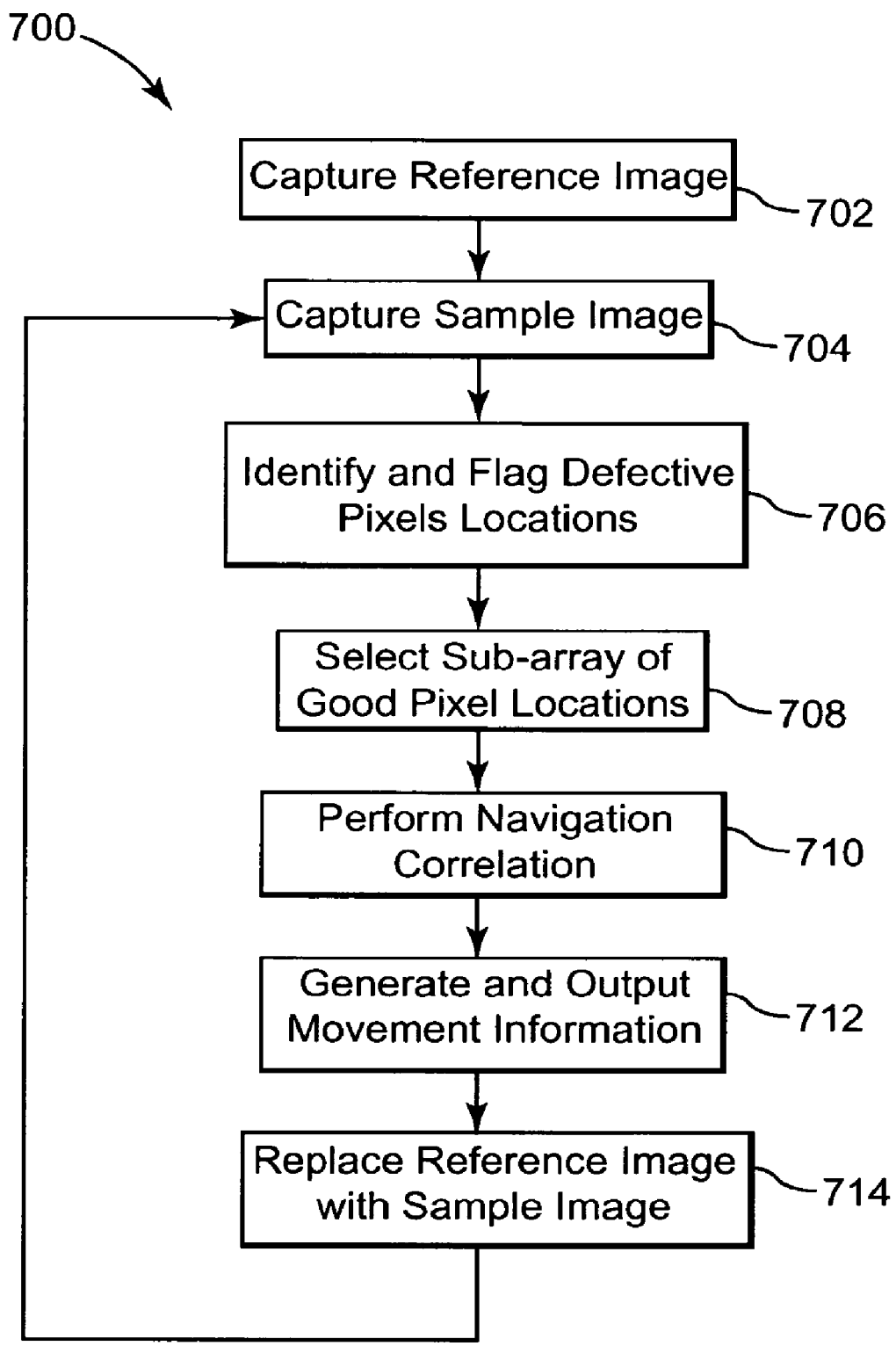
FIG. 7 is a flow diagram illustrating a method for generating movement data with the optical pointing device shown in FIG. 5 based on a sub-array of pixels according to one embodiment of the present invention.

FIG. 7 is a flow diagram illustrating a method 700 for generating movement data with the optical pointing device 500 shown in FIG. 5 based on a sub-array of pixels 536B according to one embodiment of the present invention. In step 702, a reference image is acquired by photo array 114. The acquired image is converted into a digital image by analog to digital converter 112, and the reference digital image is output to defective pixel detector 511. In step 704, a sample image is acquired by photo array 114. The acquired image is converted into a digital image by analog to digital converter 112, and the sample digital image is output to defective pixel detector 511.

In step 706, defective pixel detector 511 identifies and flags defective pixel locations in the reference digital image (acquired in step 702) and the sample digital image (acquired in step 704). In step 708, defective pixel detector 511 identifies a sub-array of good pixel locations 536B in the digital images. In one form of the invention, the sub-array 536B contains only good (e.g., non-defective) pixels, and does not include any defective pixels. In one embodiment, the sub-array of good pixel locations 536B comprises a subset of the entire array of pixels 536A contained in the digital images, such as a 22 by 22 block of pixels within a 40 by 40 pixel digital image, for example. Defective pixel detector 511 provides the sub-arrays of good pixels 536B from the reference digital image and the sample digital image to navigation processor 108.

In step 710, navigation processor 108 correlates the sub-array of good pixels 536B from the reference digital image with the sub-array of good pixels 536B from the sample digital image, and determines a magnitude and direction of movement based on the correlation. In step 712, navigation processor 108 generates movement information based on the correlation performed in step 710, and outputs the movement information to a host device via digital input/output circuitry 106. In step 714, the reference digital image (acquired in step 702) is replaced by the sample digital image (acquired in step 704), which then becomes the reference digital image for the next iteration of method 700. Another sample image is then acquired in step 704, and the method 700 is repeated from step 704. Any desired number of iterations of method 7000 may be performed.

In one embodiment, defective pixel detector 511 is implemented with digital logic and circuitry. It will be understood by a person of ordinary skill in the art that functions performed by optical pointing devices 100 and 500, including defective pixel detector 511, may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling the position of a screen pointer, the apparatus comprising:
    an at least partially coherent light source for illuminating an imaging surface, thereby generating reflected images; and
    a navigation sensor for generating digital images based on the reflected images, performing a movement computation based on the digital images, and generating movement data based on the movement computation that is indicative of relative motion between the imaging surface and the apparatus, the navigation sensor being configured to sense the reflected images from the imaging surface and perform analog-to-digital conversion on the sensed reflected images to generate the digital images,
    wherein the movement computation comprises summing only pixels values from a first one of the digital images, thereby generating a first plurality of sums, and summing only pixel values from a second one of the digital images, thereby generating a second plurality of sums.

2. The apparatus of claim 1, wherein the movement computation further comprises correlating the first plurality of sums with the second plurality of sums.

3. The apparatus of claim 1, wherein each of the digital images includes a plurality of rows of pixels and a plurality of columns of pixels, and wherein the movement computation comprises summing pixel values in each row of the digital images, thereby generating a plurality of row sums for each digital image, and summing pixel values in each column of the digital images, thereby generating a plurality of columns sums for each digital image.

4. The apparatus of claim 3, wherein the movement computation further comprises correlating the plurality of rows sums from a first one of the digital images with the plurality of row sums from a second one of the digital images, and correlating the plurality of column sums from the first one of the digital images with the plurality of column sums from the second one of the digital images.

5. A method of generating movement data with an optical pointing device, the method comprising:
    illuminating an imaging surface with an at least partially coherent light source, thereby generating reflected images;
    sensing reflected images from the imaging surface;
    performing analog-to-digital conversion on the sensed reflected images to generate digital images;
    performing a movement computation based on the digital images; and
    generating movement data based on the movement computation that is indicative of relative motion between the imaging surface and the optical pointing device,
    wherein the movement computation comprises summing only pixels values from a first one of the digital images, thereby generating a first plurality of sums, and summing only pixel values from a second one of the digital images, thereby generating a second plurality of sums.

6. The method of claim 5, wherein the movement computation further comprises correlating the first plurality of sums with the second plurality of sums.

7. The method of claim 5, wherein each of the digital images includes a plurality of rows of pixels and a plurality of columns of pixels, and wherein the movement computation comprises summing pixel values in each row of the digital images, thereby generating a plurality of row sums for each digital image, and summing pixel values in each column of the digital images, thereby generating a plurality of columns sums for each digital image.

8. The method of claim 7, wherein the movement computation further comprises correlating the plurality of rows sums from a first one of the digital images with the plurality of row sums from a second one of the digital images, and correlating the plurality of column sums from the first one of the digital images with the plurality of column sums from the second one of the digital images.

9. A navigation sensor comprising:
    a sensor array configured to sense reflected images from an imaging surface produced by an at least partially coherent light source;
    an analog to digital converter for generating digital images based on outputs of the sensor array; and
    a processor for generating movement data based on the digital images, wherein the movement data is generated based on a movement computation,
    wherein the movement computation comprises summing only pixels values from a first one of the digital images, thereby generating a first plurality of sums, and summing only pixel values from a second one of the digital images, thereby generating a second plurality of sums.

10. The navigation sensor of claim 9, wherein the movement computation further comprises correlating the first plurality of sums with the second plurality of sums.

11. The navigation sensor of claim 9, wherein each of the digital images includes a plurality of rows of pixels and a plurality of columns of pixels, and wherein the movement computation comprises summing pixel values in each row of the digital images, thereby generating a plurality of row sums for each digital image, and summing pixel values in each column of the digital images, thereby generating a plurality of columns sums for each digital image.

12. The navigation sensor of claim 11, wherein the movement computation further comprises correlating the plurality of rows sums from a first one of the digital images with the plurality of row sums from a second one of the digital images, and correlating the plurality of column sums from the first one of the digital images with the plurality of column sums from the second one of the digital images.

* * * * *